(12) United States Patent
Yamauchi

(10) Patent No.: US 6,612,391 B2
(45) Date of Patent: Sep. 2, 2003

(54) ENGINE UNIT FOR SMALL-SIZED VEHICLE

(75) Inventor: Kosaku Yamauchi, Shizuoka-Ken (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/754,128

(22) Filed: Jan. 5, 2001

(65) Prior Publication Data

US 2001/0007293 A1 Jul. 12, 2001

(30) Foreign Application Priority Data

Jan. 11, 2000 (JP) ..................... P.2000-002854

(51) Int. Cl.⁷ .................... B62M 9/08; B60K 17/02
(52) U.S. Cl. ...................... 180/292; 180/230
(58) Field of Search ................. 180/291, 292, 180/294, 219, 228, 230, 374, 375, 377, 378, 312, 231

(56) References Cited

U.S. PATENT DOCUMENTS

| | | | | |
|---|---|---|---|---|
| 4,169,512 A | * | 10/1979 | Ishikawa et al. | 180/230 |
| 4,344,500 A | * | 8/1982 | Kurata et al. | 180/230 |
| 4,505,352 A | * | 3/1985 | Onda et al. | 180/230 |
| 4,567,958 A | * | 2/1986 | Ishihara | 180/230 |
| 4,712,629 A | * | 12/1987 | Takahashi et al. | 180/230 |
| 4,723,619 A | * | 2/1988 | Yamamoto et al. | 180/219 |
| 4,887,488 A | * | 12/1989 | Miyazaki | 180/230 |
| 5,101,924 A | * | 4/1992 | Yamagiwa et al. | 180/220 |
| 5,406,154 A | * | 4/1995 | Kawaguchi et al. | 180/230 |
| 5,845,618 A | * | 12/1998 | Taue et al. | 123/317 |
| 6,073,719 A | * | 6/2000 | Ohmika et al. | 180/219 |
| 6,341,659 B1 | * | 1/2002 | Ibukuro | 180/219 |
| 6,349,785 B1 | * | 2/2002 | Ohmika et al. | 180/227 |
| 6,357,545 B1 | * | 3/2002 | Hori et al. | 180/219 |
| 6,405,821 B2 | * | 6/2002 | Tsutsumikoshi | 180/226 |

* cited by examiner

Primary Examiner—Brian L. Johnson
Assistant Examiner—Jeffrey J Restifo
(74) Attorney, Agent, or Firm—Oblon, Spivak, McClelland, Maier & Neustadt, P.C.

(57) ABSTRACT

A small-sized vehicle such as scooter-type motorcycle includes an engine unit and a power transmission unit coupled to the engine unit to be swingable. The engine unit includes a power generation section, a speed changing section, a first case into which the power generation unit is accommodated and a second case into which the speed changing section is accommodated. The first and second cases are operatively connected to each other as a unit case constituting the engine unit, which is then mounted to a vehicle body.

5 Claims, 5 Drawing Sheets

ENGINE UNIT FOR SMALL-SIZED VEHICLE

BACKGROUND OF THE INVENTION

The present invention relates to an engine unit for a small-sized motor vehicle (compact car).

Recently, however, a body, an engine and so on of a small-sized vehicle such as scooter-type motorcycle have been made large, and hence, it becomes difficult to attach or mount a swing-type engine unit, in which the engine and a power transmission unit is integrated together, to the motorcycle body to be swingable. This is because, in accordance with the requirement of the large size of the vehicle, the engine unit has a long size in its longitudinal direction and, hence, the entire length of the vehicle body is also made long. Moreover, according to such long structure, a gravity point of the vehicle is displaced to a rearward position and a load to be applied to front wheels is reduced, thus being made hard to design an alignment achieving steering and running stabilities.

To solve such inconvenience, in these days, there is provided a vehicle of the type in which an engine unit is fixed to a vehicle body and only its transmission unit is separated from the engine unit and mounted to the vehicle body to be swingable to thereby arrange the engine unit to a forward position of the vehicle body.

Further, in a general structure, a power generation portion and a speed changing portion are mounted or housed integrally in an inside of an engine unit case. However, in an arrangement in which the power generation portion and the speed changing portion are mounted or housed integrally in an inside of the engine unit case, the engine unit is made large and number of parts or elements is increased.

Moreover, a production line for manufacturing the engine unit is made long and assembling working thereof is not effectively performed on the production line.

Furthermore, the increasing of the number of the parts makes complicated quality check or inspection, and in a case where a defective is found out, it is difficult to disassemble or reassemble the parts. It is also necessary to prepare a new unit case in a case of different engine displacement or usage of engine unit, thus being inconvenient and being not economical. Still furthermore, in the arrangement in which the power generation portion and the speed changing portion are housed integrally in an inside of the engine unit case, there is a fear of transferring a heat generated at the power generation portion to the speed changing portion, thus being inconvenient.

SUMMARY OF THE INVENTION

An object of the present invention is to substantially eliminate defects or drawbacks encountered in the prior art described above and to provide an engine unit of a small-sized vehicle such as scooter-type motorcycle achieving an improvement of the productivity thereof by integrally combining respective independent sections of the vehicle structure.

This and other objects can be achieved according to the present invention by providing an engine unit of a small-sized vehicle including an engine unit and a power transmission unit coupled to the engine unit to be swingable, the engine unit comprising:

a power generation section;

a speed changing section;

a first case into which the power generation unit is accommodated; and a second case into which the speed changing section is accommodated, wherein the first and second cases are operatively connected to each other as a unit case constituting the engine unit, which is then mounted to a vehicle body.

In a preferred embodiment, the first and second cases provide substantially L-shape in plan views respectively and are opposed to each other so that longitudinal portions of the L-shaped portions thereof are overlapped to each other in a width direction of the vehicle body.

The first and second cases are coupled together with a space therebetween. The second case is formed with an exhaust port so as to be opened to the space.

More in detail, the power generation section includes an engine body and the speed changing section includes a first speed changing section as a transmission section and a second speed changing section as a differential section which is connected to the transmission section. The first case is a crank case and the second case includes a transmission case and a differential case.

The crank case, the transmission case and the differential case are coupled together as an integral unit which is to be mounted to a vehicle body frame by means of blots.

According to the structures of the present invention mentioned above, in which the crank case, the transmission case and the differential case are coupled together into an engine unit, the following advantageous functions and effects can be achieved.

The respective portions or members of the vehicle can be made compact and the number thereof to be used can be reduced, so that the respective product assembling or manufacturing lines can be made short. Thus, the quality checking can be easily and effectively done for every sections, being convenient in its handling even if defective is caused.

Since the respective sections are separated from each other, many variation in design or structure can be selected optionally by changing only one or two of them, and as a result, various types of engines can be prepared in accordance with the various needs, kinds of vehicles, and the like without substantially involving cost increase.

The separation of the engine body from the transmission section can prevent the heat from the engine from being directly transferred to the transmission device. Therefore, a V-belt and the like members can be used for a long time and the reliability can thus be improved.

Furthermore, the crank case and the transmission case are both formed to provide L-shapes in plan views so as to be opposed to each other and overlapped at longitudinal portions of the L-shaped sections in the width direction of the motorcycle body. Therefore, the space can be effectively utilized.

Still furthermore, the formation of the space can increase a heat insulation function, and hence, the temperature increasing in the transmission case can be prevented. Moreover, the exhaust port of the transmission case is formed so as to be opened to this space, so that air-flow is caused in the space, thus increasing the function for preventing the temperature increasing in the transmission case, thus being available.

The nature and further characteristic features of the present invention will be made more clear from the following descriptions made with reference to the accompanying drawings.

DESCRIPTION OF THE PREFERRED EMBODIMENT

Figure 1:
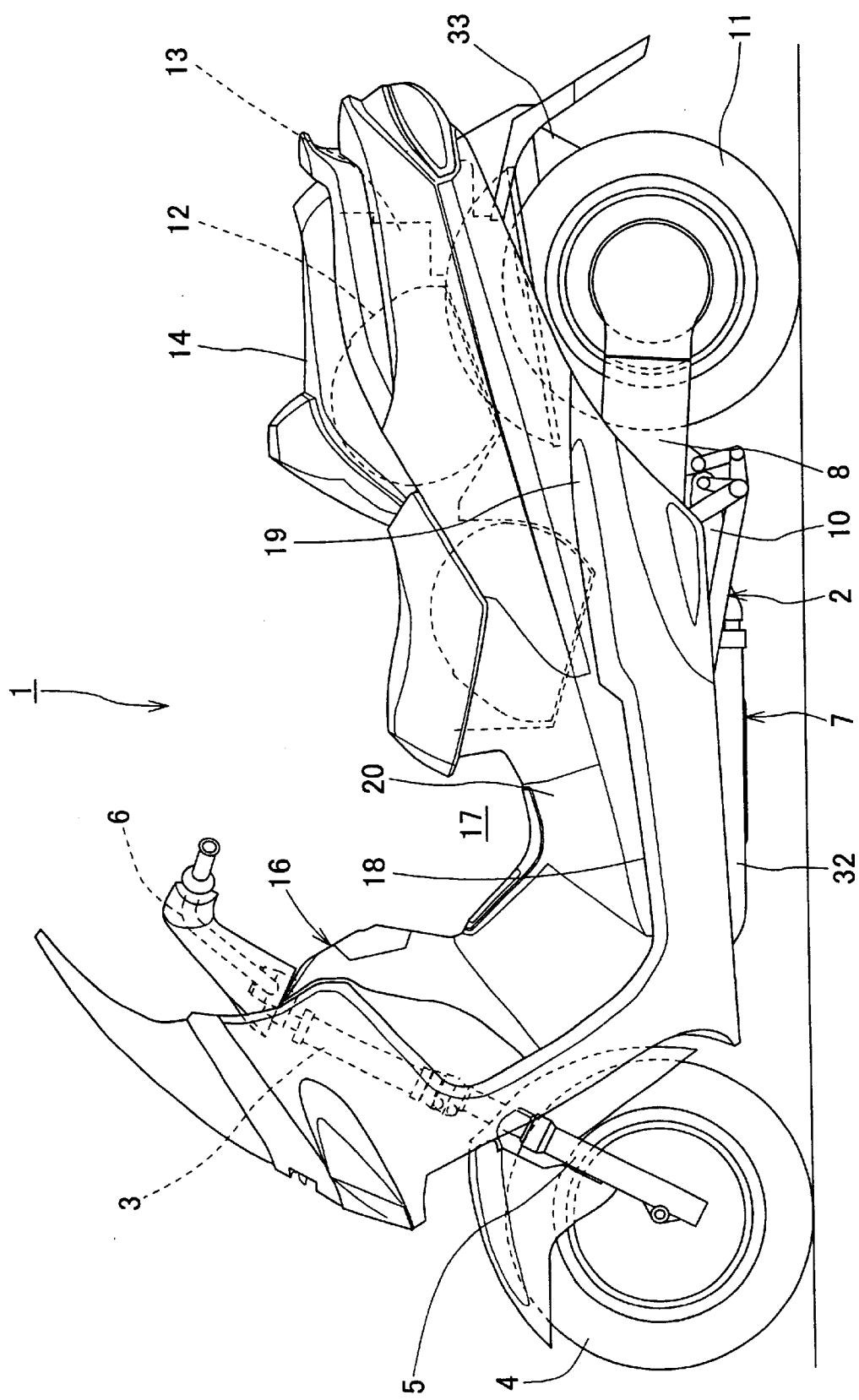
FIG. 1 is a side view of a scooter-type motorcycle having an engine unit according to one embodiment of the present invention.
Figure 2:
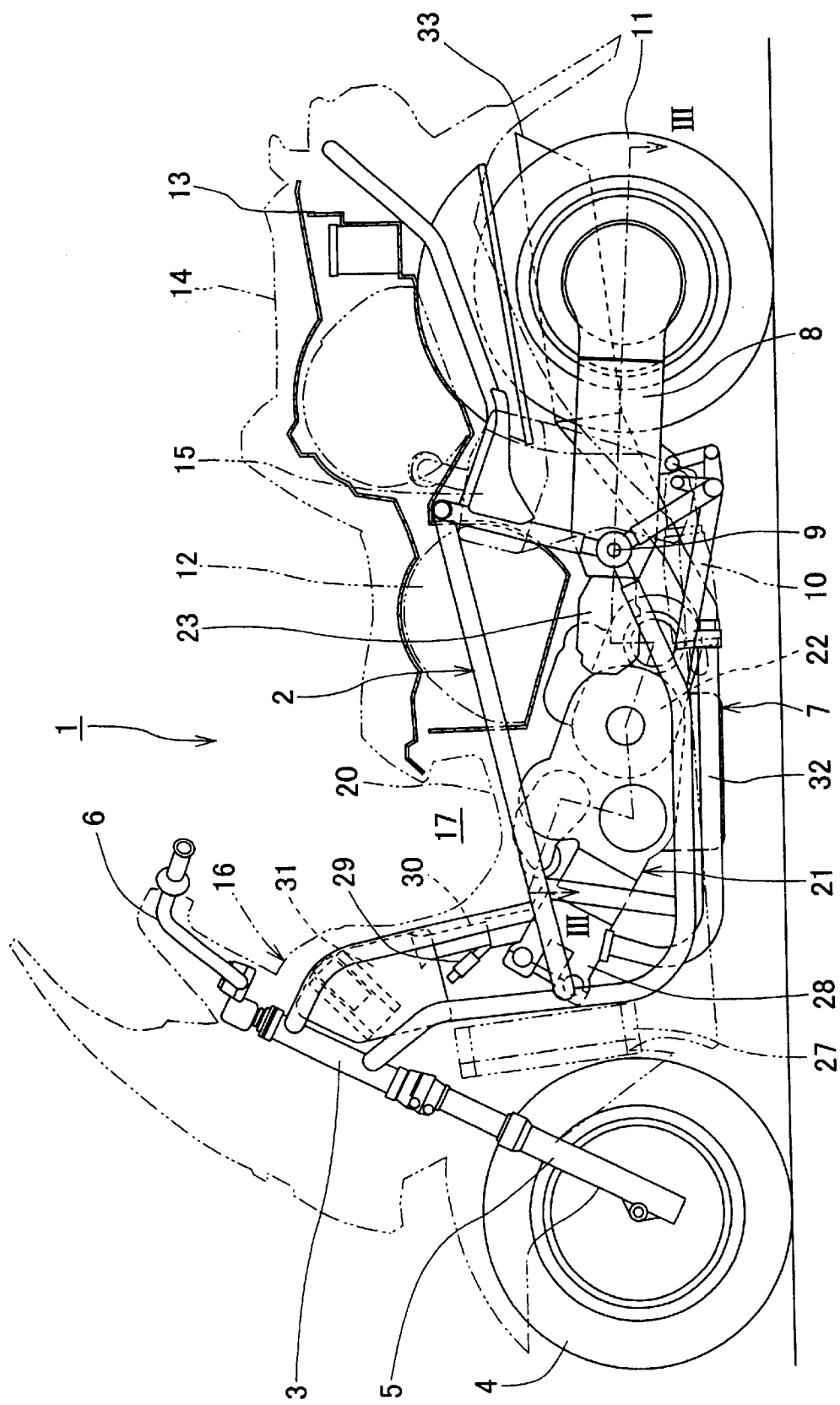
FIG. 2 is a left side view of the motorcycle of FIG. 1 showing an inner arrangement thereof.

With reference to FIGS. 1 and 2, a scooter-type small-sized motorcycle 1 has a body frame (structure) 2 having a front end portion to which a head pipe 3 is mounted. The head pipe 3 is provided with a front fork 5 and a handle lever 6 for supporting and steering a front wheel 4 to be rotatable in the lateral direction of the vehicle body.

An engine unit 7 is mounted to a central lower portion of the body frame structure 2. A transmission unit 8 as a power transmission device is arranged to a rear portion of the engine unit 7, and a front side portion of the transmission unit 8 is pivoted to a pivot portion 9 formed to the body frame 2 to be pivotal and swingable.

The transmission unit 8 is also operated (functions) as a swing arm and supported to the body frame 2 through a shock absorber 10 elastically and swingably. A rear wheel 11, as a driving wheel, is supported to a rear end portion of the transmission unit 8.

An article accommodation box (chamber) 13 for accommodating tools, articles such as helmet 12 or like is formed above the rear wheel 11, and a rider's seat 14, which also acts as a lid for the article accommodation box 13, is disposed above the accommodation box 13 to be opened or closed. Furthermore, a fuel tank 15 is arranged in a space between the lower portion of the article accommodation box 13 and the upper portion of the transmission unit 8, and the body frame structure 2 is surrounded by a body cover 16 formed as a synthetic resin product.

The body frame 2 and the body cover 16 have portions between the head pipe 3 and the rider's seat 14, these portions being bent downward in U-shape so as to provide a footing space 17 extending along the longitudinal direction (body direction) of the motorcycle 1 and to form a pair of lateral foot rest floors 18 having low bottom floor surfaces on which rider's foot are rested. Other foot rest floors 19 for a pillion rider are formed to rear portions of the foot rest floors 18. Furthermore, a portion 20 in shape of tunnel is formed to a central portion of the foot rest floors 18 so as to extend in the longitudinal direction of the motorcycle body and to project upward.

Figure 3:
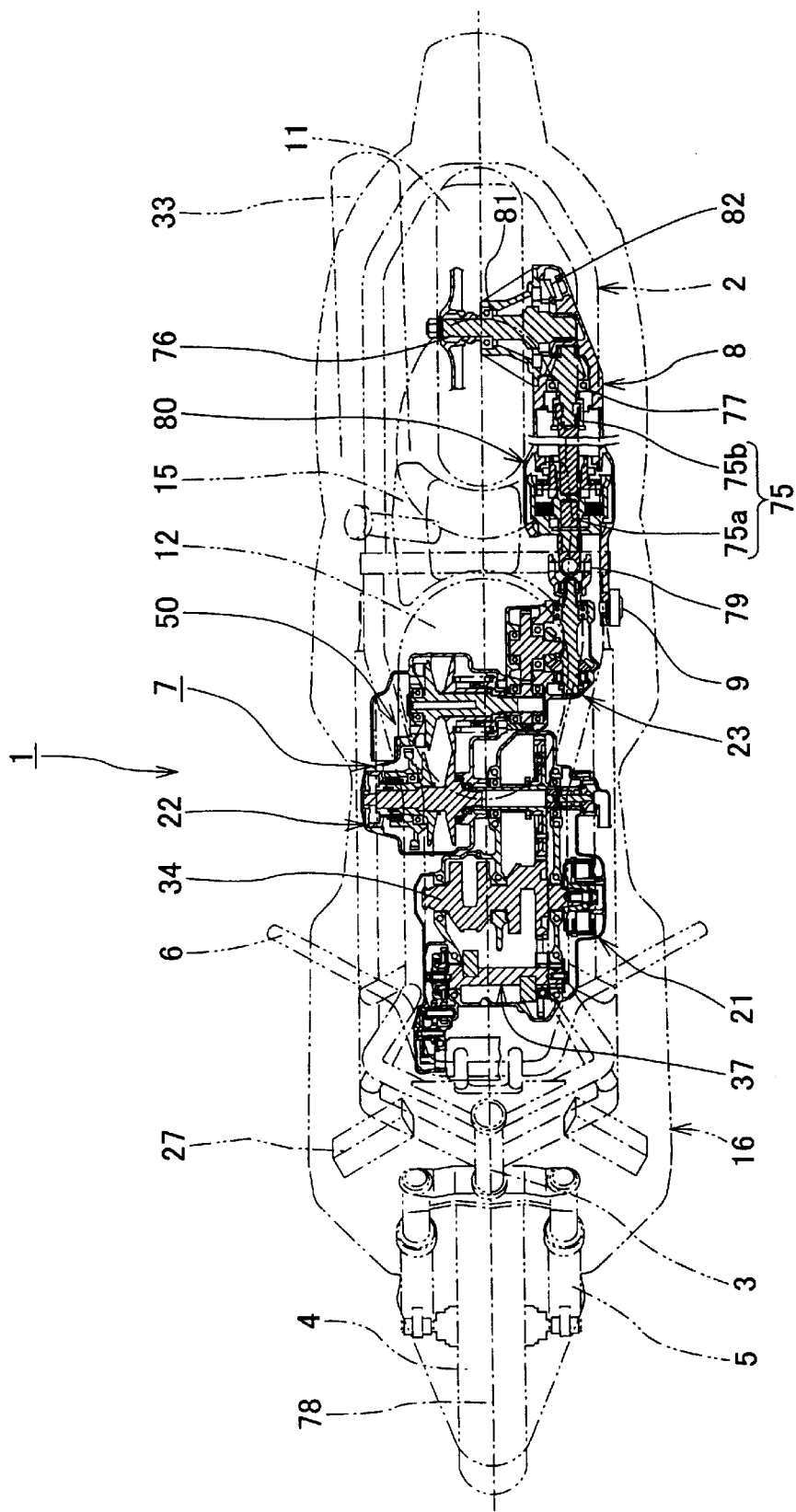
FIG. 3 is a plan view of the motorcycle of FIG. 1 or 2 in which an engine unit and a transmission device are shown in section taken along the line III—III in FIG. 2.
Figure 4:
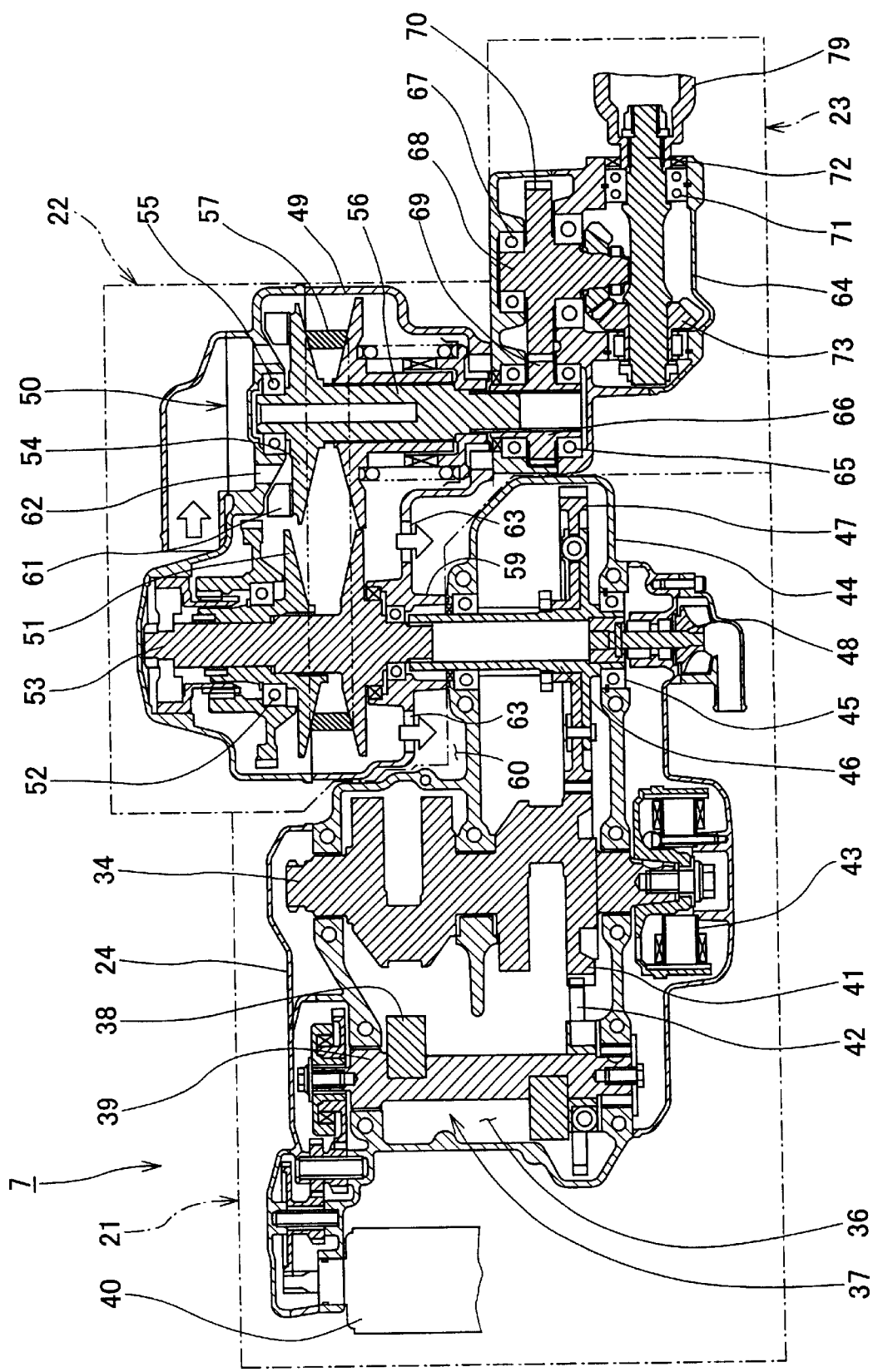
FIG. 4 is a section in a plan view of the engine unit in an enlarged scale.
Figure 5:
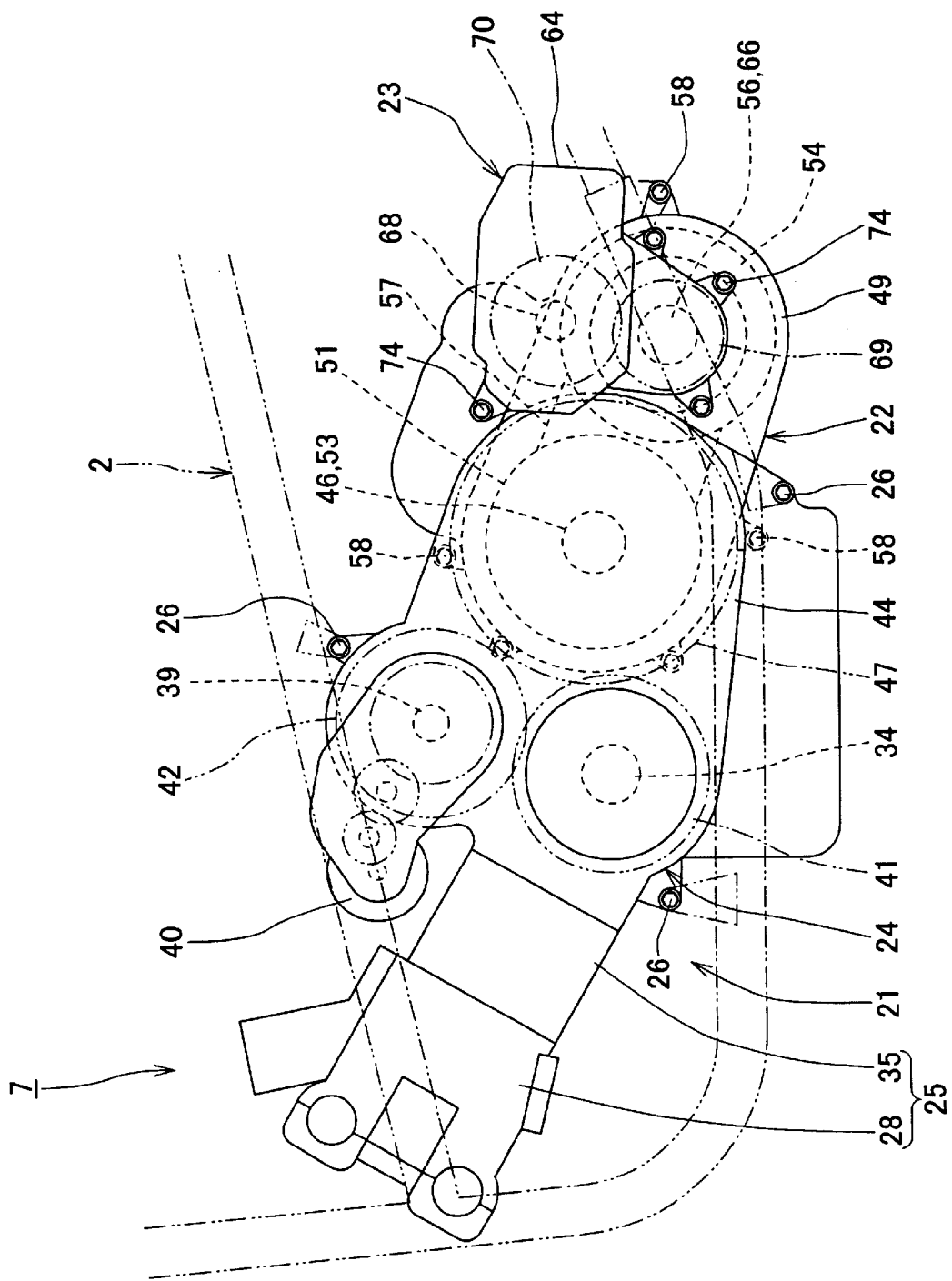
FIG. 5 is an enlarged left side view of the engine unit.

With reference to FIGS. 3 to 5, the engine unit 7 is sectioned into three portions of an engine body 21 as the power generation section, a transmission section as a first speed changing portion and a differential section as a second speed changing portion. The engine body 21 is mainly composed of a crank case 24 and a cylinder assembly 25 standing from the front portion of the crank case 24 in an obliquely forward direction. The power generation section is, as shown in detail in FIG. 5, fastened to the body frame 2 at three portions, for example, upper, front lower and rear lower portions, of the crank case 24, by means of bolts 26.

The engine body 21 mounted to the motorcycle of this embodiment is of a water-cooling type structure, in which a radiator 27 cooling a cooling water for cooling the engine body 21 is arranged in a body cover 16 between the front wheel 4 and the engine.

An intake tube 30 provided with a fuel injector 29 is connected to a rear side portion of the cylinder head 28 disposed to an upper portion of the cylinder assembly 25. Furthermore, an air cleaner 31 is disposed in a space above the cylinder assembly 25 inside the body cover 16, and this air cleaner 31 is connected to an upstream side of the intake tube 30.

On the other hand, an exhaust tube 32 is connected, at its base end portion, to the front side portion of the cylinder head 28. The exhaust tube 32 is guided around the front portion of the engine body 21 below the engine unit 7 and then extends rearward, and a muffler 33 is connected to the downstream end of the exhaust tube 32.

The engine body 21 of this embodiment is so-called a parallel two-cylinder engine in which two cylinders 35 provided with a common crankshaft 34 extending in the width direction of the motorcycle body in the crank case 24 are arranged side by side in parallel.

A balancer chamber 36 is formed above the crankshaft 34 in the crank case 24 and a balancer device 37 is arranged inside the balancer chamber 36. The balancer device 37 comprises a balancer shaft 39 which is provided with a balancer weight 38 and arranged above the crankshaft 34 in parallel thereto. A starter motor 40 as an engine starting device is coupled to the balancer shaft 39.

With further reference to FIG. 5, a primary drive gear 41 commonly acting as a balancer drive gear is arranged to one end portion (left side end of this embodiment) of the crankshaft 34, and a balancer driven gear 42 is provided at one end portion of the balancer shaft 39. These balancer drive gear 41 and balancer driven gear 42 are operatively coupled so as to transmit the rotation of the crankshaft 34 to the balancer shaft 39. A generator 43 may be disposed to an end portion of the crankshaft 34.

The crank case 24 has an extending portion (extension) 44 extending rearward so as to provide approximately an L-shape in a plane view, the extension 44 is disposed behind the primary drive gear 41, and a first coupling shaft 46 pivoted by a pair of bearings is arranged in parallel to the crankshaft 34 in the extension 44. The first coupling shaft 46 is provided with a primary driven gear 47, which is operatively coupled with the primary drive gear 41 provided for the crankshaft 34 to thereby transmit the rotation of the crankshaft 34 to the first coupling shaft 46.

A water pump 48 for circulating the cooling water is connected to one end portion, i.e. left side end in the illustrated embodiment, of the first coupling shaft 46 and the other end of the first coupling shaft 46 projects outward, rightward in the embodiment, over the crank case 24.

The transmission section 22 is arranged at a rear side portion of the crank case 24. The transmission section 22 is housed in a transmission case 49, in which a V-belt type automatic transmission device (speed-change gear) 50 is arranged. The automatic transmission device 50 is equipped with a drive pulley 51, a drive shaft 53 supported by a bearing 52 to be rotatable in the transmission case 49, a driven pulley 54 and a driven shaft 56 supported by a bearing 55 to be rotatable in the transmission case 49. The drive shaft 53 is arranged behind the crankshaft 34 and coaxially with the first coupling shaft 46 at a position opposing to the first coupling shaft 46 in the width direction of the motorcycle body. Further, a driven shaft 56 is arranged behind the drive shaft 53 in parallel thereto.

The drive shaft 53 has one end opposing to the first coupling shaft 46 (i.e. left side end in the illustrated embodiment) projects outward from the transmission case 49 and connected to the first coupling shaft 46 through, for example, a spline coupling fashion. The V-belt 57 is stretched around the drive pulley 51 and the driven pulley 54 and the rotation driving force of the engine body 21 is transmitted to the driven pulley 54 through the V-belt 57.

The transmission case 49 has an approximately L-shape as like the crank case 24 in its plan view and is arranged such that longitudinal inside surfaces of both the L-shaped portions of the crank case 24 and the transmission case 49 are overlapped in the width direction of the motorcycle body. Further, as shown in FIG. 5, the transmission case 49 is fastened by means of bolts 58 at its four front side portions to the side surface of the extension 44 of the crank case 24 and also fastened by means of bolt 58 at its one rear side portion to the body frame 2.

Furthermore, a spacer boss 59 is integrally formed to a wall portion of the transmission case 49 surrounding the drive shaft 53 projecting outside therefrom. This spacer boss 59 projects therefrom, and when the transmission case 49 is mounted to the side surface of the extension 44 of the crank case 24, a space 60 is defined by such location of the spacer boss 59 between the side surface of the transmission case 49 and the right side surface of the extension 44 of the crank case 24.

On the other hand, the driven pulley 54 is formed with a fin 61 achieving a function as an intake fan. An intake port 62 is formed to a wall portion of the transmission case 49 at, for example, a right side, of the driven pulley 54, and an exhaust port 63 is also formed to the left side wall portion of the transmission case 49 so as to be opened to the space 60. When the driven pulley 54 is rotated, external air is guided into the transmission case 49, as shown with a white arrow in FIG. 4, to thereby cool the V-belt 57 and so on, and thereafter, the air is exhausted into the space 60 between the transmission case 49 and the crank case 24 through the exhaust port 63.

The differential section 23 is arranged at the rear side (right side in FIG. 4) of the extension 44 of the crank case 24, and the differential section 23 is provided with a differential case 64 in which a second coupling shaft 66 is disposed so as to be supported by a bearing 65 to be rotatable. The second coupling shaft 66 is arranged coaxially with the driven shaft 56 at the position opposed thereto in the width direction of the motorcycle body, and both the shafts 56 and 66 are connected together, for example, through the spline coupling, so that the rotation driving force of the engine body 21 reduced in speed by the transmission device 50 is transmitted to the second coupling shaft 66.

Further, a secondary shaft 68 rotatably supported by a bearing 67 is arranged in parallel with the second coupling shaft 66 in the differential case 64 disposed above the second coupling shaft 66. A secondary drive gear 69 is mounted to the second coupling shaft 66, and a secondary driven gear 70 is mounted to one end portion of the secondary shaft 68, The secondary drive gear 69 and the secondary driven gear 70 are operatively engaged to thereby transmit the rotation driving force of the engine body 21 to the secondary shaft 68.

Furthermore, a transmission shaft 72 is arranged in the differential case 64 to be normal to the secondary shaft 68 and supported by a bearing 71 to be rotatable. Accordingly, the rotational direction of the secondary shaft 68 is changed by 90 degrees through a bevel gear 73 and transmitted to the transmission shaft 72.

Further, as shown in FIG. 5, the differential case 64 is fastened to the left side surface, for example, at a rear portion of the transmission case 49 by means of bolts 74.

The rotation driving force transmitted to the transmission shaft 72 from the engine body 21 is transmitted to an axle shaft 76 of the rear wheel 11 through a propeller shaft 75, which is supported by a plurality of bearings 77 to be rotatable and housed in the transmission unit 8. This transmission unit 8 is disposed in a manner offset to one side from the center line 78 extending in the longitudinal direction of the motorcycle body, i.e. to the left side in the motorcycle advancing direction, reverse to the location of the muffler 33 in the illustrated embodiment shown in FIG. 3.

The propeller shaft 75 is divided into a front shaft portion 75a and a rear shaft portion 75b. The front shaft portion 75a and the transmission shaft 72 are coupled by means of a universal joint 79, for example, so that the rotation driving force of the engine body 21 is transmitted to the propeller shaft 75 even when the transmission unit 8 is swung vertically around the pivot portion 9.

Further, a clutch mechanism is connected to the coupling portion between the front and rear shaft portions 75a and 75b of the propeller shaft 75 in the transmission unit 8. This clutch mechanism 80 is, for example, composed of an electromagnetically controllable wet-type multi-disc clutch.

The electromagnetically controllable wet-type multi-disc clutch mechanism mentioned herein comprises, though not shown in detail, a pilot clutch which is electrically intermittently controllable and has a small transmission torque and a main clutch which can transmit a torque larger than that of the pilot clutch. Through every connection of the pilot clutch, a rotational phase difference is caused between the pilot clutch and the main clutch, and this rotational phase difference is converted into a pressing force of a pressure plate of the main clutch by a cam mechanism provided for the pilot clutch and then amplified to thereby make it possible to transmit the large torque. Response of the clutch will be improved by making compact the electromagnetically controllable pilot clutch and also make it possible to make compact the entire engine structure. Further, a centrifugal-type clutch mechanism may be utilized in place of the electromagnetically controllable wet-type multi-disc clutch mechanism of the structure mentioned above.

Furthermore, the axle shaft 76 is supported to be rotatable by a bearing 81 at a portion near the rear end of the rear shaft portion 75b, and the rotational direction of the propeller shaft 75 is changed by 90 degrees through the bevel gear 82 and the rotation is then transmitted to the axle shaft 76.

The embodiment of the present invention of the structure mentioned above will function or operate as follows.

According to the present invention, the engine body 21 as the power generation section, the transmission section 22 as the first speed changing section and the differential section 23 as the second speed changing section are housed respectively independently in the crank case 24, the transmission case 49 and the differential case 64, and these cases are then coupled by means of, for example, bolts 26, 58 and 74 into a single integral unit case, which can be thereafter mounted and fixed, as engine unit, to the motorcycle body frame 2.

According to such structure, the following advantageous effects can be achieved.

(1) The respective portions or members can be made compact and the number thereof to be used can be reduced, so that the respective product assembling or manufacturing lines including the final assembling line can be made short. As a result, the quality checking can be done for every sections, thus improving the quality of the product and being convenient in its handling even if defective is caused.

(2) Since the respective sections are separated from each other, many variation in design or structure can be selected by changing only one or two of them, and as a result, various types of engines can be prepared in accordance with exhaust amounts, kinds of motorcycles, usages thereof and so on without involving cost increase.

(3) The separation of the engine body 21 from the transmission section 22 can prevent the heat from the engine from being directly transferred to the transmission device 50. As a result, the V-belt 57 and the like members can be used for a long time and the reliability can thus be improved.

Further, the crank case 24 and the transmission case 49 are both formed to provide an L-shape in a plan view so as to be opposed to each other and overlapped at longitudinal portions of the L-shaped sections in the width direction of the motorcycle body. Therefore, the space can be effectively utilized, the width of the engine unit 7 can be made short, and the footing feeling of a rider can be improved.

Still furthermore, since the space 60 is formed between the transmission case 49 and the crank case 24, the space 60 can increase a heat insulation function, and the temperature increasing in the transmission case 49 can be hence prevented. Moreover, the exhaust port 63 of the transmission case 49 is formed so as to be opened to this space 60, so that air-flow is caused in the space 60, thus increasing the function for preventing the temperature increasing in the transmission case 49.

Further, it is to be noted that, in the described embodiment, although the present invention is applied to a scooter-type motorcycle as one example of a small-sized vehicle, the present invention may be further applied to a small-sized four-wheel driven vehicle or other small-sized vehicles.

What is claimed is:

1. An engine unit of a small-sized vehicle including an engine unit and a power transmission unit, coupled to the engine unit to be swingable with respect to the engine unit, said engine unit comprising:

a power generation section;

a speed changing section;

a first case into which said power generation unit is accommodated; and a second case into which said speed changing section is accommodated, wherein said first and second cases are operatively connected to each other as a unit case constituting the engine unit, which is configured to be fixedly mounted to a vehicle body, wherein said first and second cases provide substantially L-shape in plan views respectively and are opposed to each other so that longitudinal portions of the L-shaped portions thereof are overlapped to each other in a width direction of the vehicle body.

2. An engine unit of a small-sized vehicle according to claim 1, wherein said first and second cases are coupled together with a space therebetween.

3. An engine unit of a small-sized vehicle according to claim 2, wherein said second case is formed with an exhaust port so as to be opened to said space.

4. An engine unit according to claim 1, wherein said power generation section includes an engine body, said speed changing section includes a first speed changing section as a transmission section and a second speed changing section as a differential section operatively connected to the transmission section, said first case is a crank case, said second case includes a transmission case and a differential case.

5. An engine unit according to claim 4, wherein said crank case, said transmission case and said differential case are coupled together as an integral unit which is to be mounted to a vehicle body frame by bolts.

* * * * *